(12) United States Patent
Jacobs et al.

(10) Patent No.: US 9,176,910 B2
(45) Date of Patent: Nov. 3, 2015

(54) SENDING A NEXT REQUEST TO A RESOURCE BEFORE A COMPLETION INTERRUPT FOR A PREVIOUS REQUEST

(71) Applicant: International Business Machines Corporation, Armonk, NY (US)

(72) Inventors: Stuart Z. Jacobs, Lakeville, MN (US); David A. Larson, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 331 days.

(21) Appl. No.: 13/768,620

(22) Filed: Feb. 15, 2013

(65) Prior Publication Data
US 2014/0237149 A1 Aug. 21, 2014

(51) Int. Cl.
*G06F 13/24* (2006.01)
*G06F 13/16* (2006.01)

(52) U.S. Cl.
CPC ............ *G06F 13/24* (2013.01); *G06F 13/1642* (2013.01)

(58) Field of Classification Search
CPC ...... G06F 12/02; G06F 13/24; G06F 9/45533
USPC ................ 710/267; 718/1; 711/165
See application file for complete search history.

(56) References Cited

U.S. PATENT DOCUMENTS

| 8,312,175 | B2 | 11/2012 | Patale et al. |
| 9,058,287 | B2* | 6/2015 | Jacobs et al. .................... 1/1 |
| 2006/0004975 | A1* | 1/2006 | Matheny ..................... 711/165 |
| 2006/0256105 | A1* | 11/2006 | Scarlata et al. ............... 345/418 |
| 2007/0192765 | A1* | 8/2007 | Shimogawa et al. ............. 718/1 |
| 2010/0223611 | A1* | 9/2010 | Mahalingam et al. ............ 718/1 |
| 2011/0185125 | A1* | 7/2011 | Jain et al. ..................... 711/122 |
| 2012/0284709 | A1 | 11/2012 | Lorenc et al. |
| 2013/0297832 | A1* | 11/2013 | Ahmad et al. ..................... 710/5 |

FOREIGN PATENT DOCUMENTS

WO WO2007123541 A1 11/2007

* cited by examiner

*Primary Examiner* — Tim T Vo
*Assistant Examiner* — Phong H Dang
(74) *Attorney, Agent, or Firm* — Owen J. Gamon; Roy W. Truelson

(57) ABSTRACT

In an embodiment, in response to receiving a completion interrupt for a first request from a resource, a determination is made whether relocation of memory contents accessed by performance of the first request is in progress. If the relocation of the memory contents accessed by performance of the first request is in progress, a second request is sent to the resource before the memory relocation completes. If the relocation of the memory contents accessed by the performance of the first request is not in progress, the completion interrupt for the first request is sent to the virtual machine that initiated the first request.

15 Claims, 7 Drawing Sheets

SENDING A NEXT REQUEST TO A RESOURCE BEFORE A COMPLETION INTERRUPT FOR A PREVIOUS REQUEST

FIELD

An embodiment of the invention generally relates to computer systems and more particularly to sending requests to shared resources and sending completion interrupts to virtual machines.

BACKGROUND

Computer systems typically comprise a combination of computer programs and hardware, such as semiconductors, transistors, chips, circuit boards, cards, storage devices, and processors, which are referred to as resources. The computer programs are stored in the storage devices and are executed by the processors.

Some computer systems support parallel processing. From a hardware standpoint, computers increasingly rely on multiple microprocessors to provide increased workload capacity. From a program standpoint, multithreaded operating systems and kernels have been developed, which permit computer programs to concurrently execute in multiple threads, so that multiple tasks can essentially be performed at the same time. In addition, some computers implement the concepts of virtual machines or logical partitioning, where a single physical computer operates essentially like multiple and independent virtual computers, referred to as virtual machines or logical partitions, with the various resources in the physical computer (e.g., processors, memory, adapters, and input/output devices) allocated among the various virtual machines via a partition manager, or hypervisor. Each virtual machine may execute a separate operating system, and from the perspective of users and of the programs executing in the virtual machine, operates as a fully independent computer. Each virtual machine essentially competes with other virtual machines for the limited resources of the computer, and the needs of each virtual machine may change over time, so that the virtual machines may share the limited resources of the computer system.

SUMMARY

A method, computer-readable storage medium, and computer are provided. In an embodiment, in response to receiving a completion interrupt for a first request from a resource, a determination is made whether relocation of memory contents accessed by performance of the first request is in progress. If the relocation of the memory contents accessed by performance of the first request is in progress, a second request is sent to the resource before the memory relocation completes. If the relocation of the memory contents accessed by the performance of the first request is not in progress, the completion interrupt for the first request is sent to the virtual machine that initiated the first request.

It is to be noted, however, that the appended drawings illustrate only example embodiments of the invention, and are therefore not considered a limitation of the scope of other embodiments of the invention.

DETAILED DESCRIPTION

Figure 1:
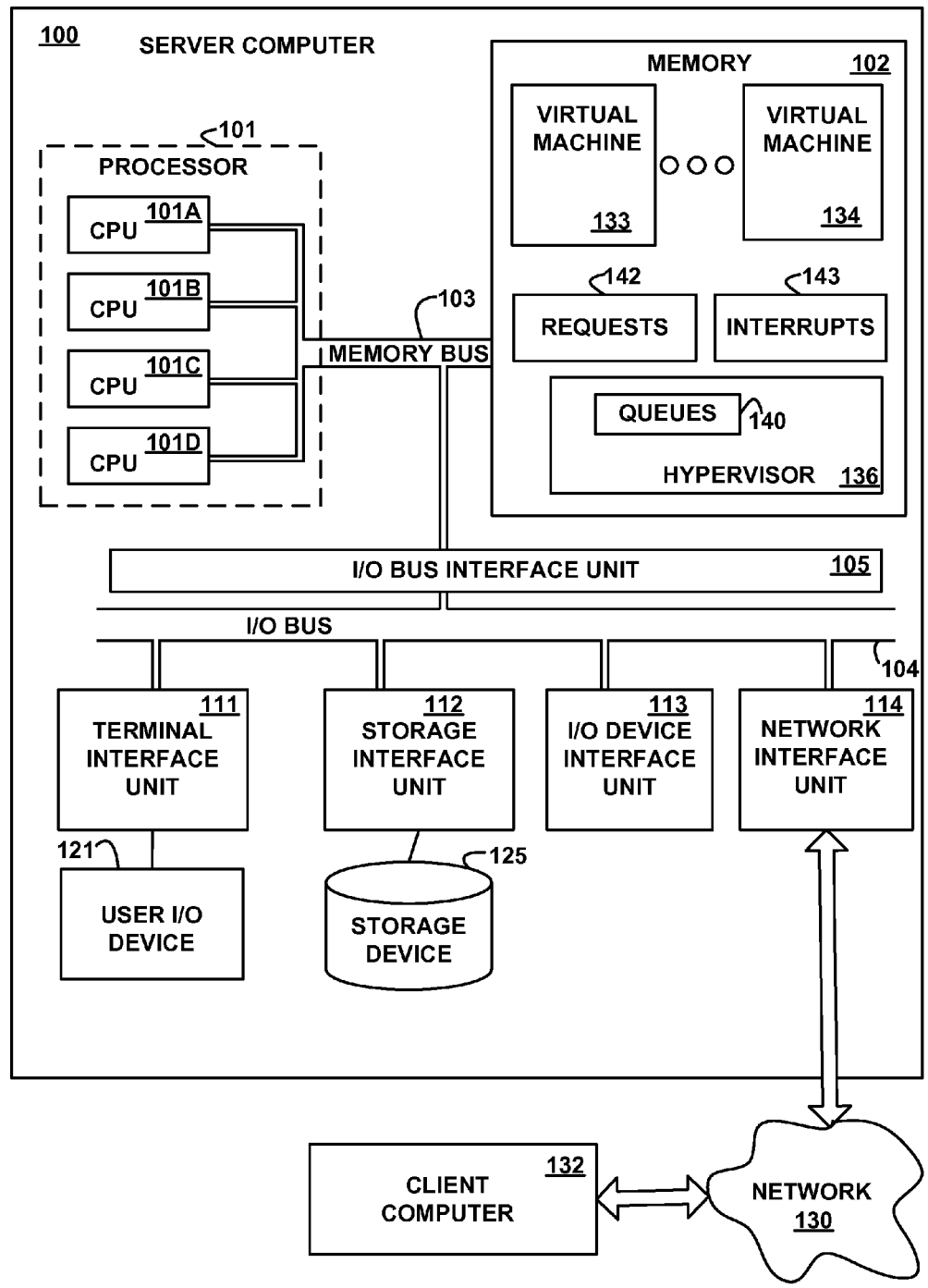
FIG. 1 depicts a high-level block diagram of an example system for implementing an embodiment of the invention.

Referring to the Drawings, wherein like numbers denote like parts throughout the several views, FIG. 1 depicts a high-level block diagram representation of a server computer system 100 connected to a client computer system 132 via a network 130, according to an embodiment of the present invention. The terms "server" and "client" are used herein for convenience only, and in various embodiments a computer system that operates as a client computer in one environment may operate as a server computer in another environment, and vice versa. The mechanisms and apparatus of embodiments of the present invention apply equally to any appropriate computing system.

The major components of the server computer system 100 comprise one or more processors 101, memory 102, a terminal interface unit 111, a storage interface unit 112, an I/O (Input/Output) device interface unit 113, and a network interface unit 114, all of which are communicatively coupled, directly or indirectly, for inter-component communication via a memory bus 103, an I/O bus 104, and an I/O bus interface unit 105.

The computer system 100 contains one or more general-purpose programmable central processing units (CPUs) 101A, 101B, 101C, and 101D, herein generically referred to as the processor 101. In an embodiment, the computer system 100 contains multiple processors typical of a relatively large system; however, in another embodiment the computer system 100 may alternatively be a single CPU system. Each processor 101 executes instructions stored in the memory 102 and may comprise one or more levels of on-board cache.

In an embodiment, the memory 102 may comprise a random-access semiconductor memory, storage device, or storage medium for storing or encoding data and programs. In another embodiment, the memory 102 represents the entire virtual memory of the computer system 100, and may also include the virtual memory of other computer systems coupled to the computer system 100 or connected via the network 130. The memory 102 is conceptually a single monolithic entity, but in other embodiments the memory 102 is a more complex arrangement, such as a hierarchy of caches and other memory devices. For example, memory may exist in multiple levels of caches, and these caches may be further divided by function, so that one cache holds instructions while another holds non-instruction data, which is used by the processor or processors. Memory may be further distributed and associated with different CPUs or sets of CPUs, as is known in any of various so-called non-uniform memory access (NUMA) computer architectures.

The memory 102 is illustrated as containing the primary components utilized in implementing a virtual machine computing environment on the computer 100, including a plurality of virtual machines 133 and 134 managed by a hypervisor 136, requests 142 and interrupts 143. The virtual machines 133 and 134, the hypervisor 136, and the hardware resources of the server computer 100 send requests 142 and interrupts 143 to each other. Although the virtual machines 133 and 134, the hypervisor 136, the requests 142, and the interrupts 143 are illustrated as being contained within the memory 102 in the computer system 100, in other embodiments some or all of them may be on different computer systems, e.g., the client computer system 132, and may be accessed remotely, e.g., via the network 130. Further, the computer system 100 may use virtual addressing mechanisms that allow the programs of the computer system 100 to behave as if they only have access to a large, single storage entity instead of access to multiple, smaller storage entities. Thus, while the virtual machines 133 and 134, the hypervisor 136, the requests 142, and the interrupts 143 are illustrated as residing in the memory 102, these elements are not necessarily all completely contained in the same storage device at the same time.

Each of the virtual machines 133 and 134 may comprise and utilize an OS (operating system), which controls the primary operations of the virtual machines 133 and 134, in the same manner as the operating system of a non-partitioned computer. Some or all of the operating systems may be the same or different from each other. Each of the virtual machines 133 and 134 may further comprise programs or applications, which may be the same or different from each other. Any number of virtual machines 133 and 134 may be supported, and the number of the virtual machines 133 and 134 resident at any one time in the server computer 100 may change dynamically as virtual machines are added to or removed from the computer 100.

Each of the virtual machines 133 and 134 comprises instructions that execute on the processor 101 (to perform the functions as further described below with reference to FIGS. 2, 3, 4, 5, 6, and 7) in a separate, or independent, memory space, and thus each virtual machine 133 and 134 acts much the same as an independent, non-partitioned computer from the perspective of each application that executes in each such virtual machine. As such, the applications typically do not require any special configuration for use in a virtual machine environment. In various embodiments, the applications that execute within the virtual machines may be user applications, third-party applications, or any portion, multiple, or combination thereof.

Although the hypervisor 136 is illustrated as being within the memory 102, in other embodiments, all or a portion of the hypervisor 136 may be implemented in firmware or hardware. The hypervisor 136 may perform both low-level partition management functions, such as page table management and may also perform higher-level partition management functions, such as creating and deleting the virtual machines 133 and 134, concurrent I/O maintenance, and allocating/deallocating processors, memory and other hardware or program resources to/from the various virtual machines 133 and 134.

In an embodiment, the hypervisor 136 includes instructions that execute on the processor 101 or statements that are interpreted by instructions executing on the processor 101 to perform the functions as further described below with reference to FIGS. 2, 3, 4, 5, 6, and 7. In another embodiment, the hypervisor 136 may be implemented in microcode or firmware. In another embodiment, the hypervisor 136 may be implemented in hardware via logic gates and/or other appropriate hardware techniques. The hypervisor 136 further comprises queues 140, which the hypervisor 136 uses to store requests from the virtual machines 133 and 134.

The hypervisor 136 statically and/or dynamically allocates to each logical partition 134 a portion of the available resources in the computer 100. For example, each virtual machine 133 and 134 may be allocated one or more of the processors 101 and/or one or more hardware threads on which to execute, as well as a portion of the available memory 102 to access. The virtual machines 133 and 134 may share specific program and/or hardware resources such as the processors 101, such that a given resource may be utilized by more than one virtual machine 133 or 134. In the alternative, program and hardware resources may be allocated to only one virtual machine at a time. Additional resources, e.g., mass storage, backup storage, user input, network connections, and the I/O adapters therefor, are typically allocated to one or more of the virtual machines 133 and 134. Resources may be allocated in a number of manners, e.g., on a bus-by-bus basis, or on a resource-by-resource basis, with multiple logical virtual machines 133 and 134 sharing resources on the same bus. Some resources may be allocated to multiple logical virtual machines 133 and 134 at a time. The resources identified herein are examples only, and any appropriate hardware and/or program resource of the server computer system 100, the client computer system 132 and/or the network 130 that is capable of being allocated on a shared or sole basis to the virtual machines 133 and/or 134 may be used.

In various embodiments, the requests 142 may be read requests, write requests, update requests, requests to send or receive data, requests to perform operations on data, such as compression, decompression, encryption, decryption, verification, validation, rendering, formatting, displaying, printing, or any other type of request. In an embodiment, the interrupts 143 are completion interrupts, which specify that a request has completed processing. In various embodiments, the interrupts 143 may comprise an identification of the request that has completed or information from which the hypervisor 136 or the virtual machines 133 or 134 may derive, determine, or infer the request that has completed. In various embodiments, the interrupts 143 may identify the virtual machine 133 or 134 or hypervisor 136 that initiated the request that has completed or may comprise information from which the identity of the initiating virtual machine 133 or 134 or the hypervisor 136 that initiated the request that has completed may be derived.

The memory bus 103 provides a data communication path for transferring data among the processor 101, the memory 102, and the I/O bus interface unit 105. The I/O bus interface unit 105 is further coupled to the system I/O bus 104 for transferring data to and from the various I/O interface units. The I/O bus interface unit 105 communicates with multiple I/O interface units 111, 112, 113, and 114, which are also known as I/O processors (IOPs) or I/O adapters (IOAs), through the I/O bus 104.

The I/O interface units support communication with a variety of storage and I/O devices. For example, the terminal interface unit 111 supports the attachment of one or more user I/O devices 121, which may comprise user output devices (such as a video display device, speaker, and/or television set) and user input devices (such as a keyboard, mouse, keypad, touchpad, trackball, buttons, light pen, or other pointing device). A user may manipulate the user input devices using a user interface, in order to provide input data and commands to the user I/O device 121 and the computer system 100, and may receive output data via the user output devices. For example, a user interface may be presented via the user I/O device 121, such as displayed on a display device, played via a speaker, or printed via a printer.

The storage interface unit 112 supports the attachment of one or more disk drives or direct access storage devices 125 (which are typically rotating magnetic disk drive storage devices, although they could alternatively be other storage devices, including arrays of disk drives configured to appear as a single large storage device to a host computer). In another embodiment, the storage device 125 may be implemented via any type of secondary storage device. The contents of the memory 102, or any portion thereof, may be stored to and retrieved from the storage device 125, as needed. The I/O device interface 113 provides an interface to any of various other input/output devices or devices of other types, such as printers or fax machines. The network interface unit 114 provides one or more communications paths from the computer system 100 to other digital devices and computer systems 132; such paths may comprise, e.g., one or more networks 130.

Although the memory bus 103 is shown in FIG. 1 as a relatively simple, single bus structure providing a direct communication path among the processors 101, the memory 102, and the I/O bus interface 105, in fact the memory bus 103 may comprise multiple different buses or communication paths, which may be arranged in any of various forms, such as point-to-point links in hierarchical, star or web configurations, multiple hierarchical buses, parallel and redundant paths, or any other appropriate type of configuration. Furthermore, while the I/O bus interface 105 and the I/O bus 104 are shown as single respective units, the computer system 100 may, in fact, contain multiple I/O bus interface units 105 and/or multiple I/O buses 104. While multiple I/O interface units are shown, which separate the system I/O bus 104 from various communications paths running to the various I/O devices, in other embodiments some or all of the I/O devices are connected directly to one or more system I/O buses.

In various embodiments, the computer system 100 is a multi-user mainframe computer system, a single-user system, or a server computer or similar device that has little or no direct user interface, but receives requests from other computer systems (clients). In other embodiments, the computer system 100 is implemented as a desktop computer, portable computer, laptop or notebook computer, tablet computer, pocket computer, telephone, smart phone, pager, automobile, teleconferencing system, appliance, or any other appropriate type of electronic device.

The network 130 may be any suitable network or combination of networks and may support any appropriate protocol suitable for communication of data and/or code to/from the computer system 100 and the client computer system 132. In various embodiments, the network 130 may represent a storage device or a combination of storage devices, either connected directly or indirectly to the computer system 100. In another embodiment, the network 130 may support wireless communications. In another embodiment, the network 130 may support hard-wired communications, such as a telephone line or cable. In another embodiment, the network 130 may be the Internet and may support IP (Internet Protocol). In another embodiment, the network 130 is implemented as a local area network (LAN) or a wide area network (WAN). In another embodiment, the network 130 is implemented as a hotspot service provider network. In another embodiment, the network 130 is implemented as an intranet. In another embodiment, the network 130 is implemented as any appropriate cellular data network, cell-based radio network technology, or wireless network. In another embodiment, the network 130 is implemented as any suitable network or combination of networks. Although one network 130 is shown, in other embodiments any number of networks (of the same or different types) may be present.

The client computer system 132 may comprise any, some, or all of the hardware and/or computer program elements of the computer system 100.

FIG. 1 is intended to depict the representative major components of the server computer system 100, the network 130, and the client computer system 132. But, individual components may have greater complexity than represented in FIG. 1, components other than or in addition to those shown in FIG. 1 may be present, and the number, type, and configuration of such components may vary. Several particular examples of such additional complexity or additional variations are disclosed herein; these are by way of example only and are not necessarily the only such variations. The various program components illustrated in FIG. 1 and implementing various embodiments of the invention may be implemented in a number of manners, including using various computer applications, routines, components, programs, objects, modules, data structures, etc., and are referred to hereinafter as "computer programs," or simply "programs."

The computer programs comprise one or more instructions or statements that are resident at various times in various memory and storage devices in the computer system 100 and that, when read and executed by one or more processors in the computer system 100 or when interpreted by instructions that are executed by one or more processors, cause the computer system 100 to perform the actions necessary to execute steps or elements comprising the various aspects of embodiments of the invention. Aspects of embodiments of the invention may be embodied as a system, method, or computer program product. Accordingly, aspects of embodiments of the invention may take the form of an entirely hardware embodiment, an entirely program embodiment (including firmware, resident programs, micro-code, etc., which are stored in a storage device) or an embodiment combining program and hardware aspects that may all generally be referred to herein as a "circuit," "module," or "system." Further, embodiments of the invention may take the form of a computer program product embodied in one or more computer-readable medium(s) having computer-readable program code embodied thereon.

Any combination of one or more computer-readable medium(s) may be utilized. The computer-readable medium may be a computer-readable signal medium or a computer-readable storage medium. A computer-readable storage medium, may be, for example, but not limited to, an electronic, magnetic, optical, electromagnetic, infrared, or semiconductor system, apparatus, or device, or any suitable combination of the foregoing. More specific examples (an non-exhaustive list) of the computer-readable storage media may comprise: an electrical connection having one or more wires, a portable computer diskette, a hard disk (e.g., the storage device 125), a random access memory (RAM) (e.g., the memory 102), a read-only memory (ROM), an erasable programmable read-only memory (EPROM) or Flash memory, an optical fiber, a portable compact disc read-only memory (CD-ROM), an optical storage device, a magnetic storage device, or any suitable combination of the foregoing. In the context of this document, a computer-readable storage medium may be any tangible medium that can contain, or store, a program for use by or in connection with an instruction execution system, apparatus, or device.

A computer-readable signal medium may comprise a propagated data signal with computer-readable program code embodied thereon, for example, in baseband or as part of a carrier wave. Such a propagated signal may take any of a variety of forms, including, but not limited to, electro-magnetic, optical, or any suitable combination thereof. A computer-readable signal medium may be any computer-readable medium that is not a computer-readable storage medium and that communicates, propagates, or transports a program for use by, or in connection with, an instruction execution system, apparatus, or device. Program code embodied on a computer-readable medium may be transmitted using any appropriate medium, including but not limited to, wireless, wire line, optical fiber cable, Radio Frequency, or any suitable combination of the foregoing.

Computer program code for carrying out operations for aspects of embodiments of the present invention may be written in any combination of one or more programming languages, including object oriented programming languages and conventional procedural programming languages. The program code may execute entirely on the user's computer, partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of embodiments of the invention are described below with reference to flowchart illustrations and/or block diagrams of methods, apparatus (systems), and computer program products. Each block of the flowchart illustrations and/or block diagrams, and combinations of blocks in the flowchart illustrations and/or block diagrams may be implemented by computer program instructions embodied in a computer-readable medium. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified by the flowchart and/or block diagram block or blocks. These computer program instructions may also be stored in a computer-readable medium that can direct a computer, other programmable data processing apparatus, or other devices to function in a particular manner, such that the instructions stored in the computer-readable medium produce an article of manufacture, including instructions that implement the function/act specified by the flowchart and/or block diagram block or blocks.

The computer programs defining the functions of various embodiments of the invention may be delivered to a computer system via a variety of tangible computer-readable storage media that may be operatively or communicatively connected (directly or indirectly) to the processor or processors. The computer program instructions may also be loaded onto a computer, other programmable data processing apparatus, or other devices to cause a series of operational steps to be performed on the computer, other programmable apparatus, or other devices to produce a computer-implemented process, such that the instructions, which execute on the computer or other programmable apparatus, provide processes for implementing the functions/acts specified in the flowcharts and/or block diagram block or blocks.

The flowchart and the block diagrams in the figures illustrate the architecture, functionality, and operation of possible implementations of systems, methods, and computer program products, according to various embodiments of the present invention. In this regard, each block in the flowcharts or block diagrams may represent a module, segment, or portion of code, which comprises one or more executable instructions for implementing the specified logical function(s). In some embodiments, the functions noted in the block may occur out of the order noted in the figures. For example, two blocks shown in succession may, in fact, be executed substantially concurrently, or the blocks may sometimes be executed in the reverse order, depending upon the functionality involved. Each block of the block diagrams and/or flowchart illustration, and combinations of blocks in the block diagrams and/or flow chart illustrations, can be implemented by special purpose hardware-based systems that perform the specified functions or acts, in combinations of special purpose hardware and computer instructions.

Embodiments of the invention may also be delivered as part of a service engagement with a client corporation, non-profit organization, government entity, or internal organizational structure. Aspects of these embodiments may comprise configuring a computer system to perform, and deploying computing services (e.g., computer-readable code, hardware, and web services) that implement, some or all of the methods described herein. Aspects of these embodiments may also comprise analyzing the client company, creating recommendations responsive to the analysis, generating computer-readable code to implement portions of the recommendations, integrating the computer-readable code into existing processes, computer systems, and computing infrastructure, metering use of the methods and systems described herein, allocating expenses to users, and billing users for their use of these methods and systems. In addition, various programs described hereinafter may be identified based upon the application for which they are implemented in a specific embodiment of the invention. But, any particular program nomenclature that follows is used merely for convenience, and thus embodiments of the invention are not limited to use solely in any specific application identified and/or implied by such nomenclature. The exemplary environments illustrated in FIG. 1 are not intended to limit the present invention. Indeed, other alternative hardware and/or program environments may be used without departing from the scope of embodiments of the invention.

Figure 2:
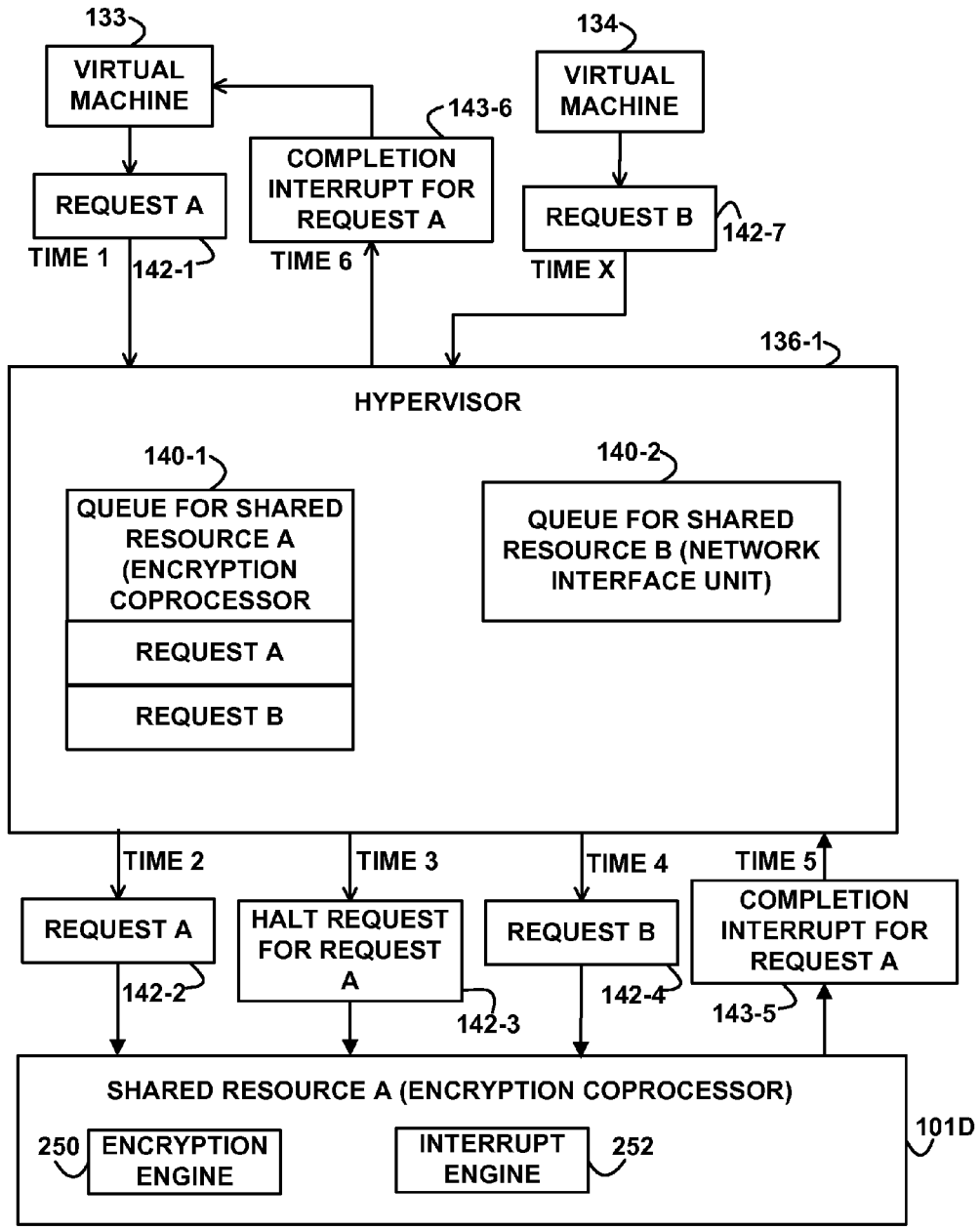
FIG. 2 depicts a block diagram of the interaction of selected components of a computer system when a halt is processed, according to an embodiment of the invention.

FIG. 2 depicts a block diagram of the interaction of selected components of the server computer system in a halt request scenario, according to an embodiment of the invention. FIG. 2 illustrates that the hypervisor 136-1 receives requests 142-1 and 142-7 from respective virtual machines 133 and 134, sends a completion interrupt for request A 143-6 to the virtual machine 133, sends request A 142-2, halt request for request A 142-3, and request B 142-4 to the shared resource A (an encryption coprocessor) 101D, and receives a completion interrupt for request A 143-5 from the shared resource 101D, all at various times. The halt request for request A 142-3 requests that the shared resource A 101D halt or stop performing the request A 142-2.

The request A 142-1, the request A 142-2, the halt request for request A 142-3, the request B 142-4, and the request B 142-7 are examples of, and are generically referred to by the requests 142 (FIG. 1). The completion interrupt for request A 143-5 and the completion interrupt for request A 143-6 are examples of, and are generically referred to by, the completion interrupts 143 (FIG. 1). The request A 142-1 is sent at time 1. The request A 142-2 is sent at time 2. The halt request for request A 142-3 is sent at time 3. The request B 142-4 is sent at time 4. The request B 142-7 is sent at time X. The completion interrupt for request A 143-5 is sent at time 5. The completion interrupt for request A 143-6 is sent at time 6.

Time 6 is after time 5, which is after time 4, which is after time 3, which is after time 2, which is after time 1. In various embodiments, time X may be after, before, or at the same time as time 1, time 2, or time 3. Time X is before time 4.

The shared resource A 101D comprises an encryption engine 250, which performs the requests 142-2, 142-3, and 142-4, and an interrupt engine 252, which sends the completion interrupt 143-5. Thus, in various embodiments, the encryption engine 250 may be busy performing requests while the interrupt engine 252 is busy sending completion interrupts 143, the encryption engine 250 may be busy performing requests while the interrupt engine 252 is idle, the encryption engine 250 may be idle while the interrupt engine 252 is busy sending a completion interrupt 143, or both the encryption engine 250 and the interrupt engine 252 may be idle.

The hypervisor 136-1 is an example of, and is generically referred to by, the hypervisor 136 (FIG. 1). The hypervisor 136-1 comprises a queue 140-1, which is assigned to the shared resource A 101D, and a queue 140-2, which is assigned to the shared resource B. The queues 140-1 and 140-2 are examples of, and are generically referred to by, the queues 140 (FIG. 1). The queue 140-1 comprises requests that the hypervisor 136-1 has received from the virtual machine 133 and/or 134, but has not yet sent to the resource A (the encryption coprocessor or CPU 101D). For example, the queue 140-1 comprises request A at a time that is after time 1 and before time 2 (between the time that hypervisor 136 receives the request A 142-1 from the virtual machine 133 and sends the request A 142-2 to the shared resource A 101D). As another example, the queue 140-1 comprises the request B at a time between time X and time 4 (between the time that the hypervisor 136-1 receives the request B 142-7 from the virtual machine 134 and the time that the hypervisor 136-1 sends the request B 142-4 to the shared resource A 101D). The queue 140-2 comprises requests that the hypervisor 136-1 has received from the virtual machine 133 and/or 134, but has not yet sent to the shared resource B (the network interface unit 114).

Thus, as illustrated in FIG. 2, the hypervisor 136-1 sends the request B 142-4 to the shared resource A 101D prior to receiving the completion interrupt for the request A 143-5 and waits to send the completion interrupt for the request A 143-6 to the virtual machine 133 until after the hypervisor 136 receives the completion interrupt for the request A 143-5 from the shared resource A 101D. Thus, the hypervisor 136-1 takes advantage of the fact that, at the same time, the interrupt engine 252 may be busy processing a completion interrupt 143, but the encryption engine 250 is idle and available to receive another request.

Figure 3:
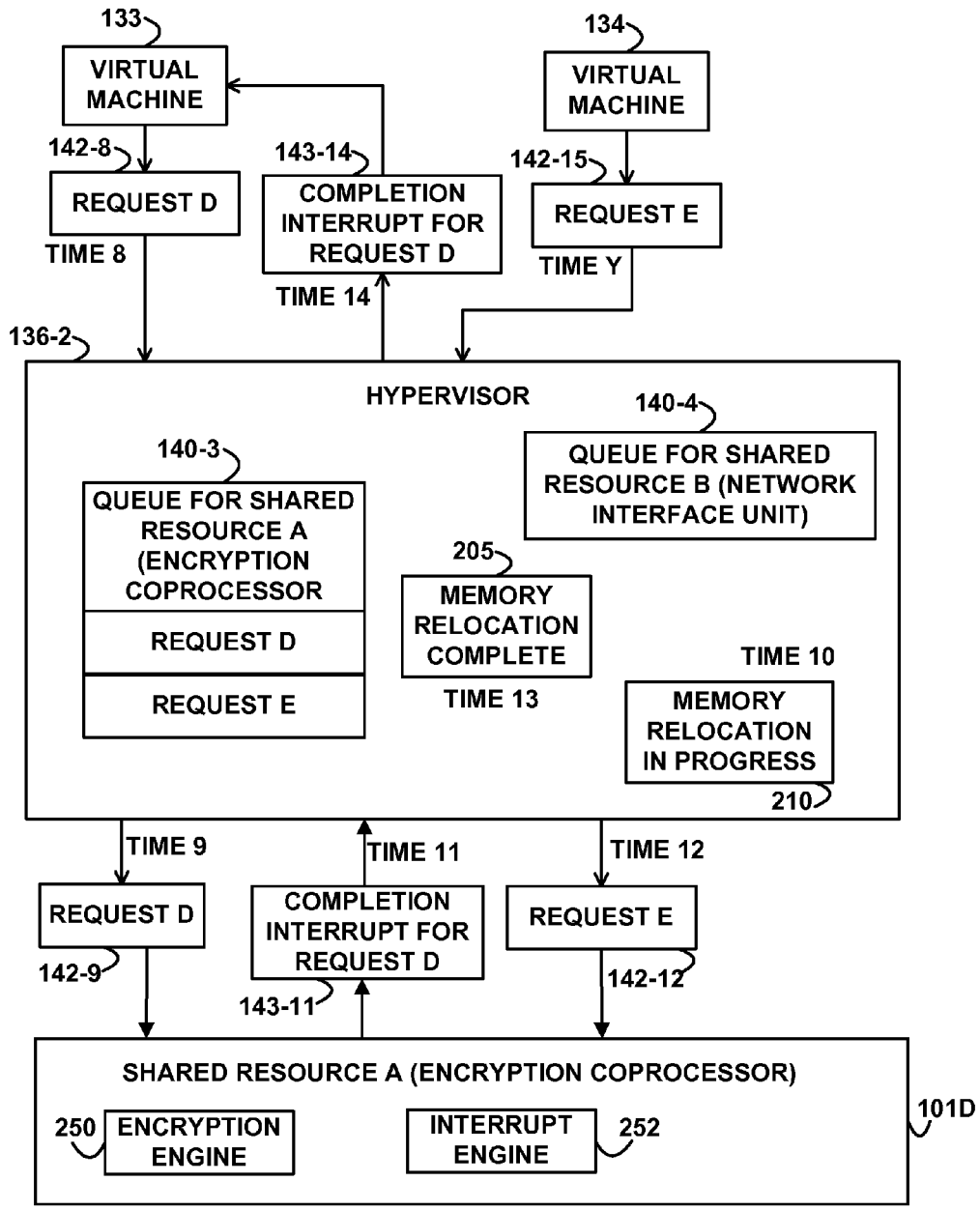
FIG. 3 depicts a block diagram of the interaction of selected components of a computer system when memory relocation is processed, according to an embodiment of the invention.

FIG. 3 depicts a block diagram of the interaction of selected components of the server computer system in a memory relocation scenario, according to an embodiment of the invention. FIG. 3 illustrates that the hypervisor 136-2 receives the request D 142-8 and request E 142-15 from the respective virtual machines 133 and 134, sends a completion interrupt for request D 143-14 to the virtual machine 133, sends the request D 142-9 and the request E 142-12 to the shared resource A (an encryption coprocessor) 101D, and receives the completion interrupt for request D 143-11 from the shared resource 101D, all at various times. The hypervisor 136-2 further determines that memory relocation is in progress 210 at time 10 and determines that memory relocation is complete 205 at time 13.

The request D 142-8, the request D 142-9, the request E 142-15, and the request E 142-12 are examples of, and are generically referred to by the requests 142 (FIG. 1). The completion interrupt for request D 143-14 and the completion interrupt for request D 143-11 are examples of, and are generically referred to by, the completion interrupts 143 (FIG. 1). The request D 142-8 is sent at time 8. The request D 142-9 is sent at time 9. The completion interrupt 143-11 is sent at time 11. The request E 142-12 is sent at time 12. The completion interrupt for request D 143-14 is sent at time 14. The request E 142-15 is sent at time Y. Time 11 is before time 13. Time 14 is after time 13. Time 12 is before time 13. Time 8 is before time 9, which is before time 10, which is before time 12. Time Y is before time 12.

The shared resource A 101D comprises an encryption engine 250, which performs the requests 142-9 and 142-12 and an interrupt engine 252, which sends the completion interrupt 143-11. Thus, in various embodiments, the encryption engine 250 may be busy performing requests while the interrupt engine 252 is busy sending completion interrupts 143, the encryption engine 250 may be busy performing requests while the interrupt engine 252 is idle, the encryption engine 250 may be idle while the interrupt engine 252 is busy sending a completion interrupt 143, or both the encryption engine 250 and the interrupt engine 252 may be idle.

The hypervisor 136-2 is an example of, and is generically referred to by, the hypervisor 136 (FIG. 1). The hypervisor 136-2 comprises a queue 140-3, which is assigned to the shared resource A, and a queue 140-4, which is assigned to the shared resource B. The queues 140-3 and 140-4 are examples of, and are generically referred to by, the queues 140 (FIG. 1). The queue 140-3 comprises requests that the hypervisor 136-2 has received from the virtual machine 133 and/or 134, but has not yet sent to the resource A (the encryption coprocessor or CPU 101D). For example, the queue 140-3 comprises request D at a time that is after time 8 and before time 9 (between the time that hypervisor 136-2 receives the request D 142-8 from the virtual machine 133 and sends the request D 142-9 to the shared resource A 101D). As another example, the queue 140-3 comprises the request E at a time between time Y and time 12 (between the time that the hypervisor 136-2 receives the request E 142-15 from the virtual machine 134 and the time that the hypervisor 136-2 sends the request E 142-12 to the shared resource A 101D). The queue 140-4 comprises requests that the hypervisor 136-2 has received from the virtual machine 133 and/or 134, but has not yet sent to the shared resource B (the network interface unit 114).

Thus, as illustrated in FIG. 3, the hypervisor 136-2 sends the request E 142-12 to the shared resource A 101D at time 12 prior to determining that the memory relocation is complete 205 at the time 13 and waits to send the completion interrupt for the request D 143-14 to the virtual machine 133 at time 14 until after the hypervisor 136 determines that the memory relocation is complete at time 13. Thus, the hypervisor 136-2 takes advantage of the fact that the encryption engine 250 may be available to receive a next request prior to the time that memory reallocation is complete for the previous request.

In various embodiments, the logic of FIGS. 4, 5, 6, and 7 may execute simultaneously, concurrently, substantially concurrently, or interleaved on the same or different of the processors 101 or the same or different of the CPUs 101A, 101B, 101C, and 101D via multi-threading, multi-programming, or multi-processing techniques. Further, the logic of FIGS. 4, 5, 6, and 7 may be executed multiple times while processing different conditions, interrupts, and requests.

Figure 4:
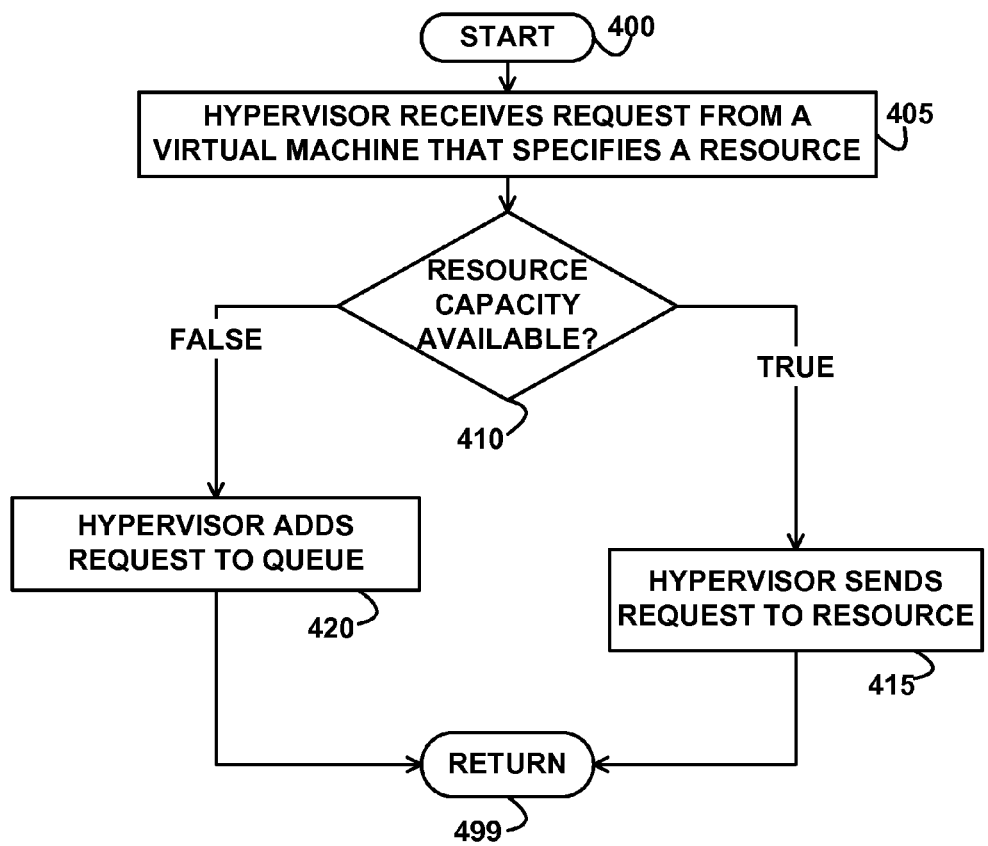
FIG. 4 depicts a flowchart of example processing for a request from a virtual machine, according to an embodiment of the invention.

FIG. 4 depicts a flowchart of example processing for a request from a virtual machine, according to an embodiment of the invention. Control begins at block 400. Control then continues to block 405 where the hypervisor 136 receives a request 142 from a virtual machine 133 or 134 that specifies a resource to which the virtual machine 133 or 134 desires the request 142 to be sent. The request 142 may further comprise or specify data and identify the virtual machine 133 or 134 that sent the request 142. Control then continues to block 410 where the hypervisor 136 determines whether the specified resource has available capacity. In various embodiments, the hypervisor 136 may determine whether the specified resource has available capacity by determining whether the resource indicates it is available, by determining whether the resource is currently processing less than its maximum number of requests, or by determining whether the resource has free memory available to accept another request 142.

If the determination at block 410 is true, then the resource has capacity available to receive another request 142, so control continues to block 415 where the hypervisor 136 sends the received request 142 to the resource. Control then continues to block 499 where the logic of FIG. 4 returns.

If the determination at block 410 is false, then the resource does not have available capacity to receive another request, so control continues to block 420 where the hypervisor 136 adds the received request 142 to the hypervisor queue 140 and does not immediately send the request 142 to the resource. Control then continues to block 499 where the logic of FIG. 4 returns.

Figure 5:
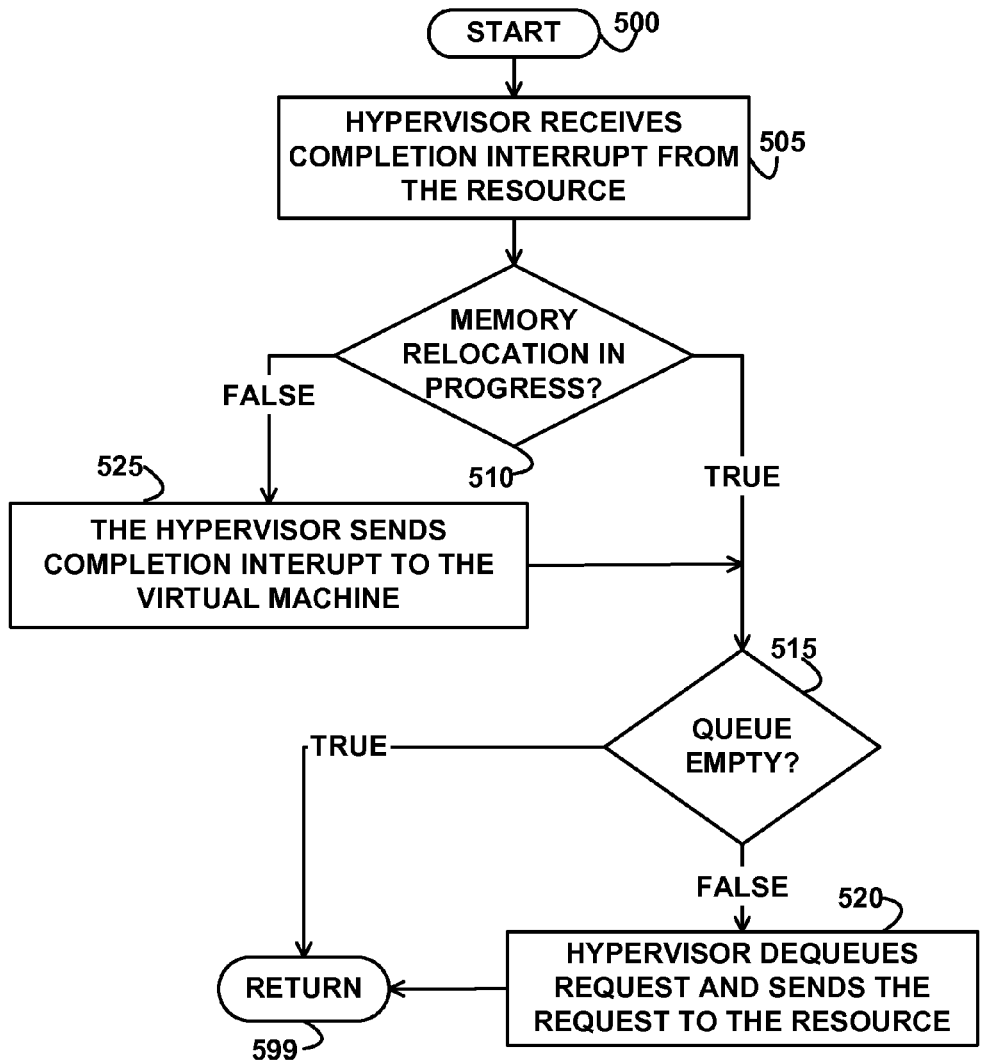
FIG. 5 depicts a flowchart of example processing for a completion interrupt, according to an embodiment of the invention.

FIG. 5 depicts a flowchart of example processing for a completion interrupt, according to an embodiment of the invention. Control begins at block 500. Control then continues to block 505 where the hypervisor 136 receives a completion interrupt 143 from a shared resource. The completion interrupt 143 specifies that a request 142, which the hypervisor 136 previously sent to the resource, has completed.

Control then continues to block 510 where the hypervisor 136 determines whether memory relocation is in progress and not complete for memory contents that were accessed (read or written) by the request 142 for which the completion interrupt 143 was received. Memory relocation is the moving of contents of the memory 102 from a source memory location to a destination memory location in a manner that is transparent to the virtual machine 133 or 134 and the shared resource. In various embodiments, the contents of the memory 102 may be relocated because a problem has occurred with the memory 102 at the source location of the relocated contents or for affinity purposes because moving contents to a destination memory location that is closer to the processor 101 that is performing computations on the memory contents improves performance of the computations.

Memory relocation that is in progress at the time that the hypervisor 136 receives a completion interrupt 143 from the shared resource for a request 142 prevents the hypervisor 136 from sending a completion interrupt 143 for requests 142 that accessed the relocated memory contents because in response to receiving the completion interrupt 143, the virtual machine 133 or 134 may attempt to access the data that was operated on by the request 142.

If the determination at block 510 is true, then memory relocation is in progress for the request for which the completion interrupt 143 was received, so control continues to block 515 (without sending a completion interrupt 143 to the virtual machine 133 or 134) where the hypervisor 136 determines whether the hypervisor queue 140 assigned to the resource that sent the completion interrupt 143 is empty. If the determination at block 515 is true, then the hypervisor queue 140 assigned to the resource that sent the completion interrupt 143 is empty, so control continues to block 599 where the logic of FIG. 5 returns.

If the determination at block 515 is false, then the hypervisor queue 140 is not empty and comprises at least one queued request, so control continues to block 520 where the hypervisor 136 dequeues (removes) a queued request 142 from the hypervisor queue 140 and sends the dequeued request 142 to the shared resource, which receives and begins processing the request 142. Control then continues to block 599 where the logic of FIG. 5 returns.

If the determination at block 510 is false, then memory relocation is not in progress for the memory contents accessed by the request 142 for which the completion interrupt 143 was received, so control continues to block 525 where the hypervisor 136 sends a completion interrupt 143 for the request 142 to the virtual machine 133 or 134 that initiated the request. Control then continues to block 515, as previously described above.

Figure 6:
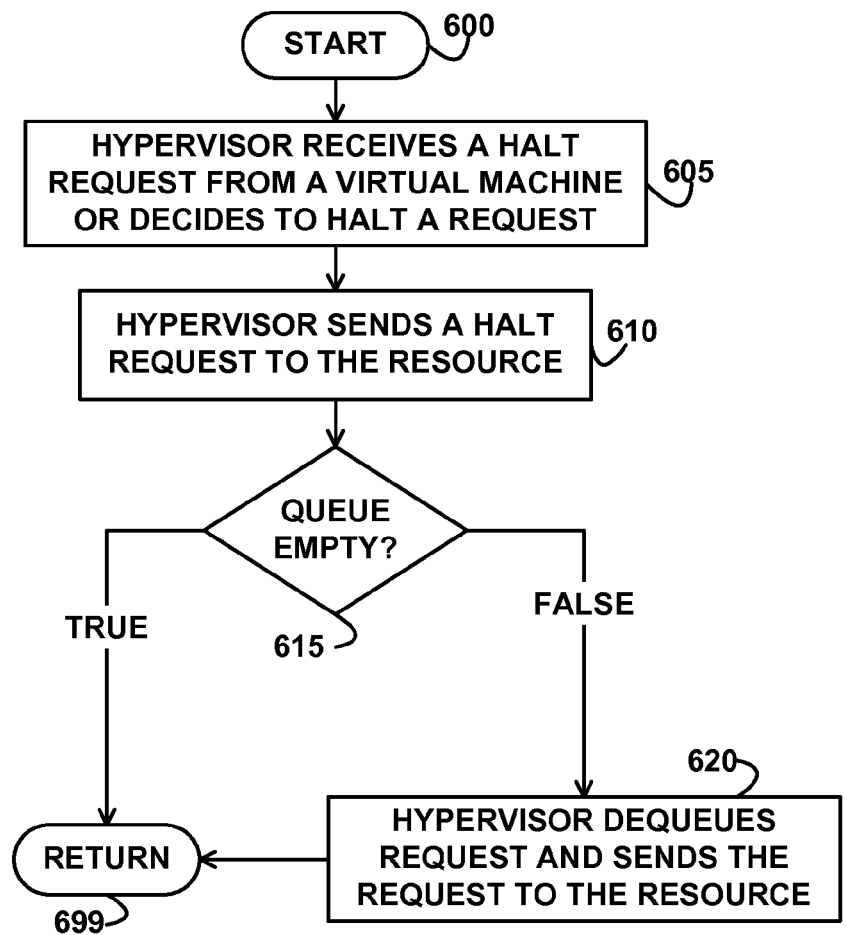
FIG. 6 depicts a flowchart of example processing for a halt request, according to an embodiment of the invention.

FIG. 6 depicts a flowchart of example processing for a halt request, according to an embodiment of the invention. Control begins at block 600. Control then continues to block 605 where the hypervisor 136 receives a halt request from a virtual machine 133 or 134 or decides to halt a request 142 that the hypervisor 136 previously received from a virtual machine 133 or 134 and that is currently being processed by the shared resource and is not complete. In various embodiments, the hypervisor 136 makes the decision to halt the request 142 in response to detecting a performance condition of the request 142 at the shared resource, such as detecting that the request 142 is long running (has consumed more than a threshold amount of time at the resource or since the request 142 was sent to the resource), detecting that a problem has occurred that prevents waiting for the request 142 to complete, or detecting that load balancing of requests 142 is necessary to more closely balance the number or speed of requests 142 between resources. In various embodiments, load balancing may comprise the hypervisor 136 halting a request 142 at one resource and resending the halted request 142 to another, less busy, resource or sending the request 142 to the same resource at a later time when the resource is less busy than the current time.

Control then continues to block 610 where the hypervisor 136 sends the halt request to the shared resource. The halt request identifies a request that is being performed by the shared resource and requests that the shared resource stop performing the request. Control then continues to block 615 where the hypervisor 136 determines whether the queue 140 assigned to the shared resource is empty (contains no queued requests). If the determination at block 615 is true, then the queue 140 is empty, so control continues to block 699 where the logic of FIG. 6 returns.

If the determination at block 615 is false, then the queue 140 assigned to the shared resource comprises at least one queue request that has not yet been sent to the shared resource, so control continues to block 620 where the hypervisor 136 dequeues a request from the queue 140 and sends the dequeued request to the shared resource before receiving a completion interrupt 143 from the shared resource for the halt request. Control then continues to block 699 where the logic of FIG. 6 returns.

Figure 7:
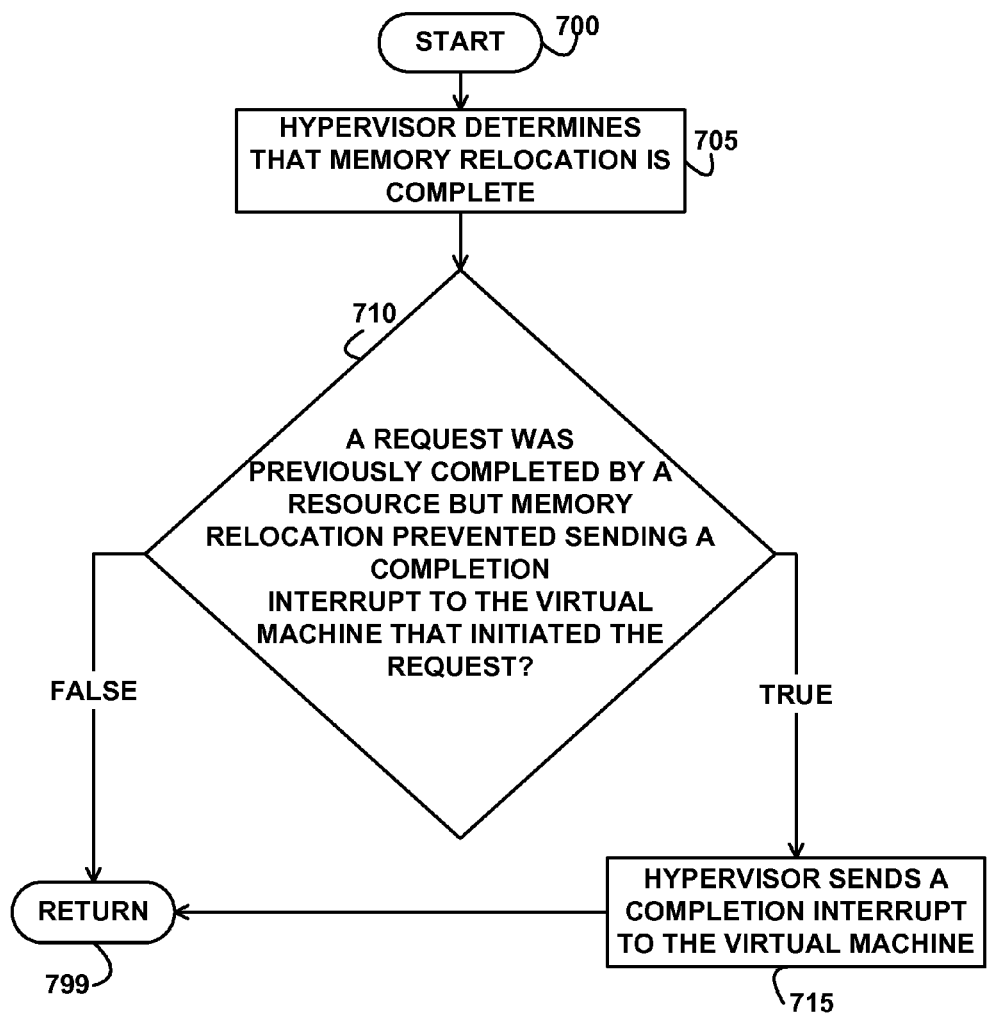
FIG. 7 depicts a flowchart of example processing for a memory relocation complete condition, according to an embodiment of the invention.

FIG. 7 depicts a flowchart of example processing for a memory relocation complete condition, according to an embodiment of the invention. Control begins at block 700. Control then continues to block 705 where the hypervisor 136 determines that a memory relocation operation is complete. Control then continues to block 710 where the hypervisor 136 determines whether a request 142 was previously completed (previous to the memory relocation operation completion) by a resource, but a memory relocation operation that was in progress for the memory contents that were accessed by that request 142 prevented the hypervisor 136 from sending a completion interrupt 143 to the virtual machine 133 or 134 that initiated the request 142. If the determination at block 710 is true, then a request 142 was previously completed by a resource for which memory relocation was in progress for the memory contents that were accessed by that request 142, which prevented the hypervisor 136 from sending a completion interrupt 143 to the virtual machine 133 or 134 that initiated the request 142, so control continues to block 715 where the hypervisor 136 sends a completion interrupt 143 for the previously completed request 142 to the virtual machine 133 or 134 that initiated the request 142. Control then continues to block 799 where the logic of FIG. 7 returns.

If the determination at block 710 is false, then a request 142 was not previously completed by a resource, or memory relocation was not in progress for a previously completed request 142, or the hypervisor 136 was not prevented from sending a completion interrupt 143 to the virtual machine 133 or 134 that initiated the request 142, so control continues to block 799 without sending a completion interrupt 143 to the virtual machine 133 or 134.

In this way, in an embodiment, capacity and processing power of resources is made available to the next request before the hypervisor 136 reports the current request as complete to the requesting virtual machine 133 or 134, which increases performance of requests.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises" and/or "comprising," when used in this specification, specify the presence of the stated features, integers, steps, operations, elements, and/or components, but do not preclude the presence or addition of one or more other features, integers, steps, operations, elements, components, and/or groups thereof. In the previous detailed description of exemplary embodiments of the invention, reference was made to the accompanying drawings (where like numbers represent like elements), which form a part hereof, and in which is shown by way of illustration specific exemplary embodiments in which the invention may be practiced. These embodiments were described in sufficient detail to enable those skilled in the art to practice the invention, but other embodiments may be utilized and logical, mechanical, electrical, and other changes may be made without departing from the scope of the present invention. In the previous description, numerous specific details were set forth to provide a thorough understanding of embodiments of the invention. But, embodiments of the invention may be practiced without these specific details. In other instances, well-known circuits, structures, and techniques have not been shown in detail in order not to obscure embodiments of the invention.

Different instances of the word "embodiment" as used within this specification do not necessarily refer to the same embodiment, but they may. Any data and data structures illustrated or described herein are examples only, and in other embodiments, different amounts of data, types of data, fields, numbers and types of fields, field names, numbers and types of rows, records, entries, or organizations of data may be used. For example, tables, databases, or trees may be used as alternative organizations of data. In addition, any data may be combined with logic, so that a data structure separate from logic is not necessary. The previous detailed description is, therefore, not to be taken in a limiting sense.

What is claimed is:

1. A method performed by a computer system, comprising:
    sending a first request by a hypervisor to a shared resource for performing an operation by the shared resource, wherein the hypervisor manages a plurality of virtual machines and the shared resource is shared by the plurality of virtual machines managed by the hypervisor, the first request for performing an operation by the shared resource on behalf of a first virtual machine of the plurality of virtual machines managed by the hypervisor;
    responsive to completion of performance of the operation requested by the first request in the shared resource, receiving in the hypervisor a completion interrupt for the first request from the shared resource;
    in response to receiving in the hypervisor the completion interrupt for the first request from the shared resource, determining by the hypervisor whether relocation of memory contents accessed by performance of the first request is in progress, relocation of memory contents being the moving of contents of memory from a source memory location to a destination memory location in a manner that is transparent to the plurality of virtual machines managed by the hypervisor;
    if the relocation of the memory contents accessed by performance of the first request is in progress, then waiting to send a completion interrupt for the first request from the hypervisor to the first virtual machine until after the memory relocation completes, and sending a second request by the hypervisor to the shared resource before the memory relocation completes, the second request for performing an operation by the shared resource on behalf of a virtual machine of the plurality of virtual machines managed by the hypervisor; and
    if the relocation of the memory contents accessed by the performance of the first request is not in progress, sending the completion interrupt for the first request from the hypervisor to the first virtual machine.

2. The method of claim 1, further comprising:
    sending a halt request to the shared resource, wherein the halt request causes the shared resource to halt a third request; and
    in response to the sending the halt request to the shared resource, sending a fourth request to the shared resource before receiving a completion interrupt from the shared resource for the halt request.

3. The method of claim 2, further comprising:
    deciding to perform the sending the halt request to the shared resource.

4. The method of claim 3, wherein the deciding to perform the sending the halt request to the shared resource further comprises:
    receiving the halt request from the virtual machine.

5. The method of claim 3, wherein the deciding to perform the sending the halt request to the shared resource further comprises:
    detecting a performance condition of the second request at the shared resource.

6. A non-transitory computer-readable storage medium encoded with instructions, wherein the instructions when executed comprise:
    sending a first request by a hypervisor to a shared resource for performing an operation by the shared resource, wherein the hypervisor manages a plurality of virtual machines and the shared resource is shared by the plurality of virtual machines managed by the hypervisor, the first request for performing an operation by the shared resource on behalf of a first virtual machine of the plurality of virtual machines managed by the hypervisor;

responsive to completion of performance of the operation requested by the first request in the shared resource, receiving in the hypervisor a completion interrupt for the first request from the shared resource;

in response to receiving in the hypervisor the completion interrupt for the first request from the shared resource, determining by the hypervisor whether relocation of memory contents accessed by performance of the first request is in progress, relocation of memory contents being the moving of contents of memory from a source memory location to a destination memory location in a manner that is transparent to the plurality of virtual machines managed by the hypervisor;

if the relocation of the memory contents accessed by performance of the first request is in progress, sending a second request by the hypervisor to the shared resource before the memory relocation completes, the second request for performing an operation by the shared resource on behalf of a virtual machine of the plurality of virtual machines managed by the hypervisor, and waiting to send a completion interrupt for the first request from the hypervisor to the first virtual machine until after the memory relocation completes;

if the relocation of the memory contents accessed by the performance of the first request is not in progress, sending the completion interrupt for the first request from the hypervisor to the first virtual machine;

sending a halt request to the shared resource, wherein the halt request causes the shared resource to halt a third request; and in response to the sending the halt request to the shared resource, sending a fourth request to the shared resource before receiving a completion interrupt from the shared resource for the halt request.

7. The non-transitory computer-readable storage medium of claim 6, further comprising:
deciding to perform the sending the halt request to the shared resource.

8. The non-transitory computer-readable storage medium of claim 7, wherein the deciding to perform the sending the halt request to the shared resource further comprises:
receiving the halt request from the virtual machine.

9. The non-transitory computer-readable storage medium of claim 7, wherein the deciding to perform the sending the halt request to the shared resource further comprises:
detecting a performance condition of the second request at the shared resource.

10. A computer comprising:
a processor; and
memory communicatively coupled to the processor, wherein the memory is encoded with instructions, and wherein the instructions when executed on the processor comprise
sending a first request by a hypervisor to a shared resource for performing an operation by the shared resource, wherein the hypervisor manages a plurality of virtual machines and the shared resource is shared by the plurality of virtual machines managed by the hypervisor, the first request for performing an operation by the shared resource on behalf of a first virtual machine of the plurality of virtual machines managed by the hypervisor, responsive to completion of performance of the operation requested by the first request in the shared resource, receiving in the hypervisor a completion interrupt for the first request from the shared resource, in response to receiving, at the hypervisor, the completion interrupt for the first request from the shared resource, determining, at the hypervisor, whether relocation of memory contents accessed by performance of the first request is in progress, relocation of memory contents being the moving of contents of memory from a source memory location to a destination memory location in a manner that is transparent to the plurality of virtual machines managed by the hypervisor, if the relocation of the memory contents accessed by performance of the first request is in progress, sending a second request from the hypervisor to the shared resource before the memory relocation completes, the second request for performing an operation by the shared resource on behalf of a virtual machine of the plurality of virtual machines managed by the hypervisor, and waiting to send a completion interrupt for the first request from the hypervisor to the first virtual machine until after the memory relocation completes, if the relocation of the memory contents accessed by the performance of the first request is not in progress, sending the completion interrupt for the first request from the hypervisor to the first virtual machine;

deciding to send a halt request from the hypervisor to the shared resource, sending a halt request from the hypervisor to the shared resource, wherein the halt request causes the shared resource to halt a third request, and in response to the sending the halt request from the hypervisor to the shared resource, sending a fourth request from the hypervisor to the shared resource before receiving a completion interrupt, at the hypervisor, from the shared resource for the halt request.

11. The computer of claim 10, wherein the deciding to send the halt request to the shared resource further comprises:
receiving the halt request from the virtual machine.

12. The computer of claim 10, wherein the deciding to perform the sending the halt request to the shared resource further comprises:
detecting a performance condition of the second request at the shared resource.

13. The computer of claim 10, wherein the computer further comprises the shared resource and wherein the shared resource comprises an encryption coprocessor.

14. The method of claim 1, wherein the shared resource comprises a hardware coprocessor.

15. The non-transitory computer readable storage medium of claim 6, wherein the shared resource comprises a hardware coprocessor.

* * * * *